United States Patent
Ueno

(10) Patent No.: US 6,680,744 B2
(45) Date of Patent: Jan. 20, 2004

(54) LASER SCANNER AND A COPYING MACHINE USING THE SAME

(75) Inventor: Sueo Ueno, Mishima (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 90 days.

(21) Appl. No.: 10/096,904

(22) Filed: Mar. 14, 2002

(65) Prior Publication Data

US 2002/0135669 A1 Sep. 26, 2002

(30) Foreign Application Priority Data

Mar. 22, 2001 (JP) .......................................... 2001-082611

(51) Int. Cl.[7] ................. B41J 2/44; B41J 2/47
(52) U.S. Cl. ........................................ 347/250; 347/235
(58) Field of Search ................. 347/229, 234, 347/235, 250

(56) References Cited

U.S. PATENT DOCUMENTS 6,476,370 B1 * 11/2002 Suzuki et al. ................ 347/235

FOREIGN PATENT DOCUMENTS

| JP | 5-281487 | 10/1993 | | |
|----|----------|---------|---|---|
| JP | 7-234368 | 9/1995 | | |
| JP | 200223096 A | * | 1/2002 | .............. B41J/2/44 |

* cited by examiner

*Primary Examiner*—Huan Tran
(74) *Attorney, Agent, or Firm*—Foley & Lardner

(57) ABSTRACT

A laser scanner is adapted to cause a laser beam to scan in the main-scanning direction by deflecting the laser beam by means of a deflecting optical system. A horizontal synchronizing signal is obtained by detecting the laser beam by means of a photodetector. Forced emission of laser beam is started after a predetermined time period since the detection of the laser beam, which predetermined time period is variable as a function of the rotary speed of the deflector section. With this arrangement, a horizontal synchronizing signal can be reliably detected if the rotary speed of the deflecting operation system fluctuates.

21 Claims, 8 Drawing Sheets

| Selected value | Reference value |
|---|---|
| 0 | 12158 |
| 1 | 12139 |
| 2 | 12120 |
| 3 | 12101 |
| ⋮ | ⋮ |
| 125 | 9783 |
| 126 | 9764 |
| 127 | 9745 |
| 128 | 9726 |
| 129 | 9707 |
| 130 | 9688 |
| ⋮ | ⋮ |
| 254 | 7332 |
| 255 | 7313 |

LASER SCANNER AND A COPYING MACHINE USING THE SAME

CROSS-REFERENCE TO RELATED APPLICATIONS

This application is based upon and claims the benefit of priority from the prior Japanese Patent Application No. 2001-082611, filed Mar. 22, 2001, the entire contents of which are incorporated herein by reference.

BACKGROUND OF THE INVENTION

1. Field of the Invention

This invention relates to a laser scanner that can suitably be applied to an electrophotography type image forming device in the recording section of a digital copying machine. The present invention also relates to a copying machine realized by using such a laser beam scanner.

2. Description of the Related Art

A digital copying machine is adapted to read a document by means of a document reading device and copying the document on a sheet of paper by means of an image forming device on the basis of the image data obtained by reading the document.

The original reading device and the image forming device are configured and regulated in such a way that the document reading characteristics of the former and the printing characteristics of the latter match each other so that the obtained image may be an exact copy of the document. However, the two sets of characteristics may be mismatching due to the variance in the make of those devices and other reasons. Then, it will no longer be able to obtain an exact copy of the document.

More specifically, when a document as shown in FIG. 6 that shows straight lines drawn in the sub-scanning direction and arranged at a pitch of 58.6 mm in the main-scanning is copied, the pitch of arrangement of straight lines may be narrowed in the copy as shown in FIG. 7 because of the mismatching of the reading characteristics of the document reading device and the printing characteristics of the image forming device. Or, the pitch of arrangement of straight lines may be enlarged in the copy as shown in FIG. 8.

In the case where the image forming device is an electrophotographic device comprising a laser scanner A as shown in FIG. 12, the above problem can be dissolved by regulating the laser scanner A. Referring to FIG. 12, reference symbol 7a denotes an operation board to be used for inputting data relating to the rotary speed of polygon mirror 2 and reference symbol 8a denotes a selected value output section for outputting a value selected on the basis of the data input through the operation board 7a, while reference symbol 9a denotes a conversion table for storing numerical values corresponding to the selected value and a frequency divider circuit 13 divides the frequency of the master clock to a ratio given from the conversion table 9a and outputting the obtained signal to a polygon motor drive circuit 14 as polygon drive clock. The polygon motor drive circuit 14 drives the polygon motor 3 so as to make it turn by a predetermined angle per unit time in synchronism with the polygon drive clock applied to it from frequency divider circuit 13.

A laser scanner A of the above described type is generally designed to cause a laser beam emitted from a stationary laser diode 1 to scan the photosensitive surface of a photosensitive drum 100 by making the revolving polygon mirror 2 reflect the emitted laser beam. Therefore, the scanning cycle time, that is the time necessary for the laser beam to scan a line, is determined by the rotary speed of the polygon mirror 2. The laser scanner A modulates the laser beam according to the image data given to it at a rate that is determined on the basis of the relationship between the scanning cycle time and the amount of image data on the line to be scanned.

In the laser scanner A, the scanning speed of the laser beam can be modified by regulating the rotary speed of the polygon mirror 2. Therefore, the pitch of arrangement of the lines drawn in the sub-scanning direction in FIG. 6 can be modified by utilizing the modifiable scanning speed.

Referring to FIG. 9, S1, S6 and S9 denote respective timings at which the laser beam passes through a photodetector 4. S1 shows the timing that is obtained when the polygon mirror 2 is driven to rotate at a standard rotary speed. S6 shows the timing that is obtained when the polygon mirror 2 is driven to rotate at a rotary speed higher than that of S1. S9 shows the timing that is obtained when the polygon mirror 2 is driven to rotate at a speed lower than that of S1. While the photodetector 4 is stationary, the time interval necessary for the laser beam to get to the photodetector repetitively can be modified by modifying the rotary speed of the polygon mirror 2.

S2, S7 and S10 in FIG. 9 denote output signals of the photodetector 4 that correspond to S1, S6 and S9 respectively. Any of them may be used as horizontal synchronizing signal (HSYNC signal).

S3 in FIG. 9 denotes an HSYNC start signal for causing the photodetector 4 to emit a laser beam. Counter circuit 6a starts counting by referring to the rising edge of the output of the photodetector 4. The HSYNC start signal S3 is brought up to level "H" at the timing when the counter circuit 6a has counted a predetermined number (e.g., 9726 clocks). Then, the HSYNC start signal S3 is brought down to level "L" at the rising edge of the output of the photodetector 4. In FIG. 9, the HSYNC start signal S3 corresponds to the timing of S1.

S4 in FIG. 9 denotes an image data signal containing the data of the image to be printed in a printing area. The image data signal is always transferred at a predetermined rate in synchronism with the master clock or an arbitrarily selected dot clock.

S5, S8 and S11 in FIG. 9 denote light modulation signals for actually controlling the emission of a laser beam. They correspond to S1, S6 and S9 respectively. These light modulation signals are formed by adding the HSYNC signal and the image data signal by means of OR circuit 11. Since these light modulation signals S5, S8 and S11 are defined in a manner independent from the rotary motion of the polygon mirror 2 except the timing of the falling edge of the HSYNC start signal, they show same timings.

Thus, FIG. 9 shows the timings of each of the above described signals when the rotary speed of the polygon mirror 2 is changed. In other words, the timing of the printing operation in a scanning period does not change if the rotary speed of the polygon mirror 2 is changed. However, the time necessary for the laser beam to scan a physical printing area on the photosensitive member 100 across the entire width thereof varies, although the width of the printing area is invariably fixed. Therefore, the width of the printing area as indicated by a, b and c in FIG. 9 appears to vary as a function of the rotary speed of the polygon mirror 2 because it is expressed in terms of time.

FIG. 10 illustrates the relationship of the light modulation signals S5, S8 and S11 in terms of a printing area or a single scanning period. As seen from FIG. 10, when the laser beam is emitted by means of the light modulation signal S8 that corresponds to a high rotary speed, the intervals of laser beam emissions is shorter than those of laser beam emissions by means of the light modulation signal S5 that corresponds to a standard rotary speed of the polygon mirror 2. On the other hand, when the laser beam is emitted by means of the light modulation signal S11 that corresponds to a low rotary speed, the intervals of laser beam emissions is longer than those of laser beam emissions by means of the light modulation signal S5. In this way, the pitch of forming pixels on the photosensitive member 100 is modified. In other words, the pitch of arrangement of pixels on the photosensitive member 100 can be regulated by regulating the rotary speed of the polygon mirror 2.

More specifically, when the pitch of arrangement along the main-scanning direction of the drawn lines is reduced as shown in FIG. 7, the problem is dissolved by raising the rotary speed of the polygon mirror. If the pitch of arrangement of the drawn lines is 46.9 mm as shown in FIG. 7, although it is supposed to be equal to 58.6 mm as shown in FIG. 6, the rotary speed of the polygon mirror 2 is raised to a level 1.25 times higher than the current level of rotary speed on the basis of the ratio of 58.6 mm/46.9 mm. If, on the other hand, the pitch of arrangement of the drawn lines is 70.3 mm as shown in FIG. 8, although it is supposed to be equal to 58.6 mm as shown in FIG. 6, the rotary speed of the polygon mirror 2 is reduced to a level $1/1.25$ times lower than the current level of rotary speed on the basis of the ratio of 58.6 mm/70.3 mm.

However, when the rotary speed of the polygon mirror 2 is modified in this way, the timing at which the laser beam passes the photodetector 4 and the timing at which the HSYNC start signal is brought up to level "H" come to disagree with each other as shown in FIG. 9.

As the rotary speed of the polygon mirror 2 is raised, the scanning laser beam may pass the photodetector 4 before the HSYNC start signal is brought up to level "H" as a point T1 shown in FIG. 9. Then, the laser beam will be emitted continuously over a long period TA until the scanning laser beam passes the photodetector 4 the next time. Then, a straight line that does not exist in the original will be printed in the main-scanning direction by every two main scanning lines as shown in FIG. 11A.

On the other hand, as the rotary speed of the polygon mirror 2 is lowered, the laser beam is emitted continuously, starting from a time substantially in advance of the time when the scanning laser beam passes the photodetector 4. In other words, the laser beam may be emitted continuously while it is still operated in the effective printing area as indicated by TB in FIG. 9. Then, a wrong black stripe running in the sub-scanning direction is printed as shown in FIG. 11B.

BRIEF SUMMARY OF THE INVENTION

In view of the above identified circumstances, it is therefore the object of the present invention to provide a laser scanner that can regulate the pitch of arrangement of pixels in the main-scanning direction without degrading the image quality by regulating the rotary speed of the polygon mirror and a copying machine realized by using such a laser scanner.

According to the present invention, there is provided a laser scanner that can regulate the pitch of arrangement of pixels by regulating the rotary speed of the polygon mirror without degrading image quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Now, the present invention will be described by referring to the accompanying drawing that illustrates preferred embodiments of the invention.

(1st Embodiment)

Figure 1:
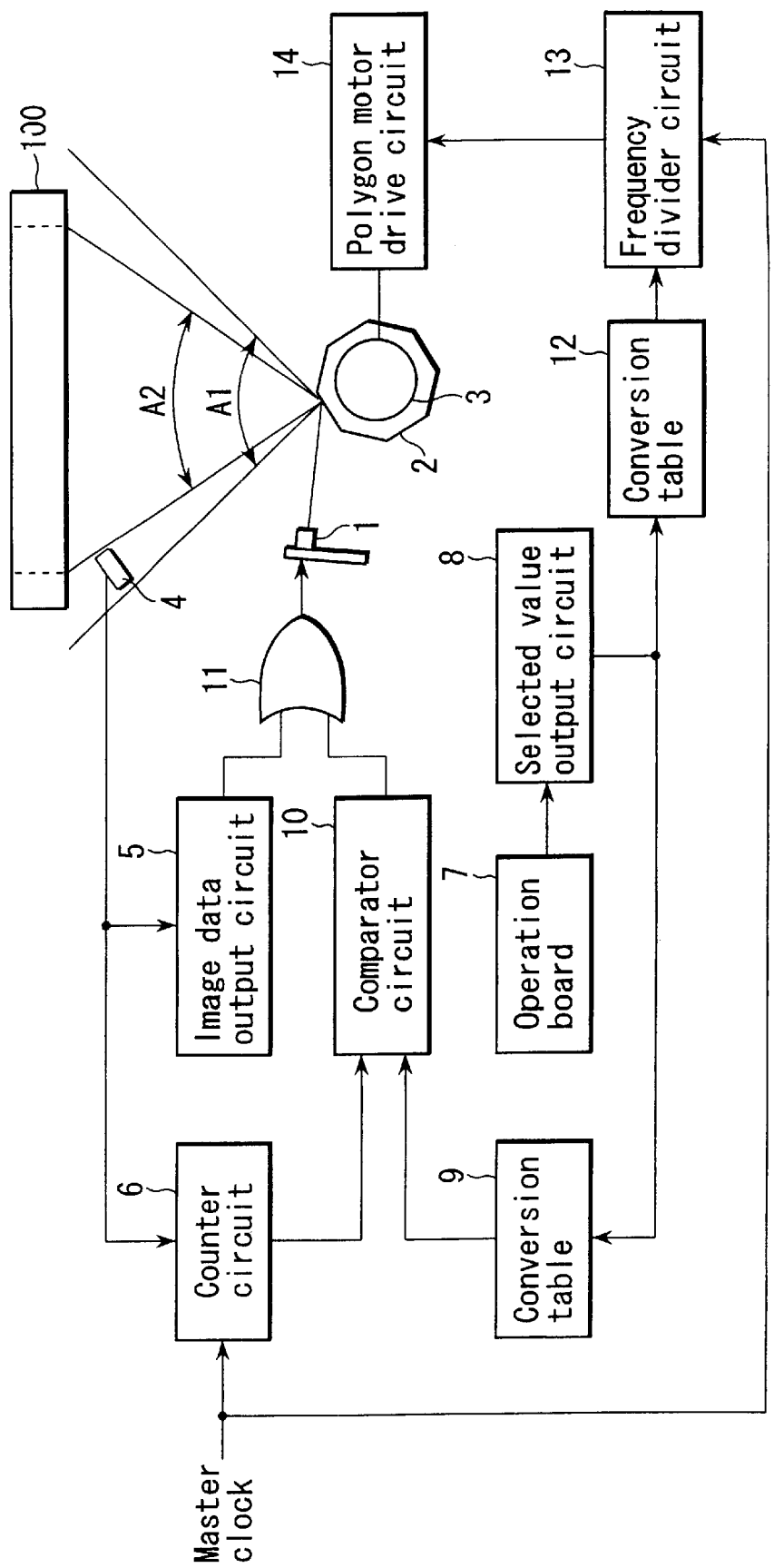
FIG. 1 is a schematic block diagram of the first embodiment of laser scanner according to the invention, illustrating a principal part thereof.

FIG. 1 is a schematic block diagram of the first embodiment of laser scanner according to the invention, illustrating a principal part thereof.

As shown in FIG. 1, the laser scanner of this embodiment causes a laser beam to scan photosensitive drum 100 and makes the latter to be exposed to light as the emission of the laser beam is intermittently suspended. The laser scanner comprises a laser diode 1, a polygon mirror 2 operating as deflection optical system, a polygon motor 3, a photodetector 4 operating as laser detection section, an image data output circuit 5 operating as light emission control section, a counter circuit 6 operating as counting section, a operation board 7, a selected value output circuit 8, a conversion table operating as reference value output section and reference value modifying section, a comparator circuit 10 operating as forced light emission control section, an OR circuit 11, a conversion table 12, a frequency divider circuit 13 and a polygon motor drive circuit 14. A horizontal synchronization detecting/control section is realized by the counter circuit 6, the conversion table 9 and the comparator circuit 10, whereas a rotary motion control section is formed by the conversion table 12, the frequency divider circuit 13 and the polygon motor drive circuit 14.

The laser diode 1 emits a laser beam toward the polygon mirror 2 in order to irradiate the photosensitive drum 100 with the laser beam. More specifically, the laser beam emitted from the laser diode 1 is modulated according to the light modulation signal output from the OR circuit 11 as the laser diode 1 is turned ON/OFF according to the light modulation signal.

The polygon mirror 2 is driven to rotate at a constant speed by the polygon motor 3. As a result, the laser beam emitted from the laser diode 1 is caused to scan an area indicated by A1 in FIG. 1.

The photo detector 4 is arranged at a position corresponding to the effective area of the photosensitive drum 100 and located off the scanning area of the laser beam. The output of the photo detector 4 is brought down to level "L" and outputs an HSYNC signal only when the photo detector 4 is irradiated by the laser beam.

The image data output circuit 5 serially outputs the data of the image to be printed on a line by line basis in synchronism with a fixed clock. The image data output circuit 5 determines the timing of starting to output the image data of a line according to the HSYNC signal output from the photodetector 4.

The counter circuit 6 is provided with a master clock. The master clock is a reference clock that defines the timings of basic operations of the image forming device in which the laser scanner is mounted. The counter circuit 6 counts the master clock and supplies the count value to the comparator circuit 10. The count value of the counter circuit 6 is reset by an HSYNC signal.

The operation board 7 has a key input section and other operating sections and receives user instructions for specifying a selected value for the rotary speed of the polygon mirror 2.

The selected value output circuit 8 outputs the selected value specified by the user and received by the operation board 7.

The conversion table 9 stores possible counts of the master clock, each of which corresponds to a scanning period of the laser beam, which by turn corresponds to each of the values that can be selected and output from the selected value output circuit 8 in the condition where such a selected value can be output from the selected value output circuit 8. The conversion table 9 applies the count that is stored in it and corresponds to the selected value output from the selected value output circuit 8 to the comparator circuit 10.

The comparator circuit 10 compares the count value sent from the counter circuit 6 and the reference value given by the conversion table 9 and outputs an HSYNC start signal that is brought up to level "H" only when the count value is not smaller than the reference value.

The OR circuit 11 adds the image data signal output from the image data output circuit 5 and the HSYNC start signal output from the comparator circuit to generate a light modulation signal.

The conversion table 12 stores predetermined frequency dividing ratios, each of which corresponds to a selected value that can be output from the selected value output circuit 8. The conversion table 12 outputs a frequency dividing ratio corresponding to the selected value output from the selected value output circuit 8 to the frequency divider circuit 13.

The frequency divider circuit 13 divides the frequency of the master clock to the ratio given by the conversion table 12 and sends the signal obtained as a result of the frequency division to the polygon motor drive circuit 14 as polygon drive clock.

The polygon motor drive circuit 14 drives the polygon motor 3 so as to make it rotate by a predetermined angle per unit time in synchronism with the polygon drive clock given from the frequency divider circuit 13.

Now, the operation of the laser scanner having the above described configuration will be discussed below.

The polygon mirror 2 is driven to rotate by the polygon motor 3 so as to make the laser beam emitted from the laser diode 1 to scan the inside of the area A1. The polygon motor 3 is driven to rotate by a predetermined angle per unit time in synchronism with the polygon drive clock obtained by dividing the frequency of the master clock to a predetermined frequency dividing ratio by means of the frequency divider circuit 13. The rotary speed of the polygon motor 3 is determined as a function of the frequency dividing ratio of the frequency divider circuit 13.

Now, the operation board 7 receives an instruction of the user in order to modify the rotary speed of the polygon mirror 2. More specifically, the range of selected values that the user can specify may be between "0" and "255" and the default value (to be referred to as selected default value hereinafter) may be "128". The user can specify a value found within the above range in order to raise or reduce the rotary speed of the polygon mirror 2 by way of the operation board 7. Then, the selected value output circuit 8 output the value specified by the user. When the specified value is equal to the default value of "128", the conversion table 12 outputs a frequency dividing ratio that makes the rotary speed of the polygon motor 3 equal to the default value. In other words, when the selected value is equal to the default value of "128", the rotary speed of the polygon motor 3 will also be equal to the default value.

As the user specifies a value for changing the currently specified value by means of the operation board 7, the selected value output circuit 8 changes the selected value it outputs to the value specified by the user. The conversion table 12 stores numerical values selected to change the frequency dividing ratio at a rate inversely proportional to the change in the selected value and outputs one of the numerical value that corresponds to the selected value. Thus, as the selected value is reduced, the frequency of the polygon drive clock is reduced to by turn reduce the rotary speed of the polygon motor 3. Conversely, as the selected value is raised, the frequency of the polygon drive clock is raised to by turn raise the rotary speed of the polygon motor 3.

Since the image data signal output from the image data output circuit 5 appears in the light modulation signal by way of the OR circuit 11 without being modified, the laser beam emitted from the laser diode 1 is modulated at a rate same as the rate at which image data are output from the image data output circuit 5. Additionally, since the image data output circuit 5 outputs image data at a constant rate, the laser beam is modulated at a constant rate.

Thus, the pitch of irradiation of the laser beam that corresponds to the arrangement of pixels on the photosensitive drum 100 is changed as the rotary speed of the polygon motor 3 is changed. In this way, the pitch of arrangement of pixels in the main-scanning direction is regulated as the selected value is modified.

The HSYNC signal to be used for causing the image output circuit 5 to output image data signals in synchronism with the scanning operation of the laser beam is generated by the photodetector 4, the counter circuit 6 and the comparator circuit 10 in a manner as described below.

Firstly, the photodetector 4 detects the laser beam and the counter circuit 6 is reset at the timing for bringing down the HSYNC signal to level "L". As a result, the counter circuit 6 counts the count of the master clock from the time when the photodetector 4 detects the laser beam. The count value is constantly compared with the reference value output from the conversion table 9 by the comparator circuit 10. As long as the count value is smaller than the reference value, the comparator circuit 10 holds the HSYNC signal to level "L". Therefore, only the image data signal output from the image data output circuit 5 appears in the light modulation signal.

Once the count value becomes equal to or greater than the reference value, the comparator circuit 10 brings the HSYNC signal to level "H". As a result, the light modulation signal is constantly held to level "H" so that the photo detector 4 can detect the laser beam. Thereafter, since the counter circuit 6 is reset as a result detection by the photodetector 4 of the laser beam, the count value becomes smaller than the reference value so that the comparator circuit 10 brings back the HSYNC signal to level "L" and the emission of the laser beam is suspended continuously.

In this way, the laser beam is forcibly emitted from the time after the elapse of a predetermined time period since the detection of the laser beam by the photodetector 4 to the next detection of the of the laser beam by the photodetector 4 so as to allow the photodetector to detect the laser beam.

The time period from the time when the laser beam is detected by the photodetector 4 to the start of the forced emission of laser beam is defined by the reference value output from the conversion table 9, which reference value is modified by the selected value output from the selected value output circuit 8.

The conversion table 9 stores the values determined by means of the equation of $$B = C - (A - D) \times E,$$

where A is the selected value, B is the reference value, C is the value (counter default value) obtained by subtracting a certain margin from the master clock count corresponding to the scanning period when the rotary speed of the polygon motor 3 is equal to the default value, D is the selected default value and E is the variation of the master clock count of the single scanning period as determined on the basis of the ratio of the change in the rotary speed of the polygon motor 3 due to the change by a step of the selected value. The values stored in the conversion table 9 corresponds to each of the values of A=0 to 255.

Figures 2, 4:
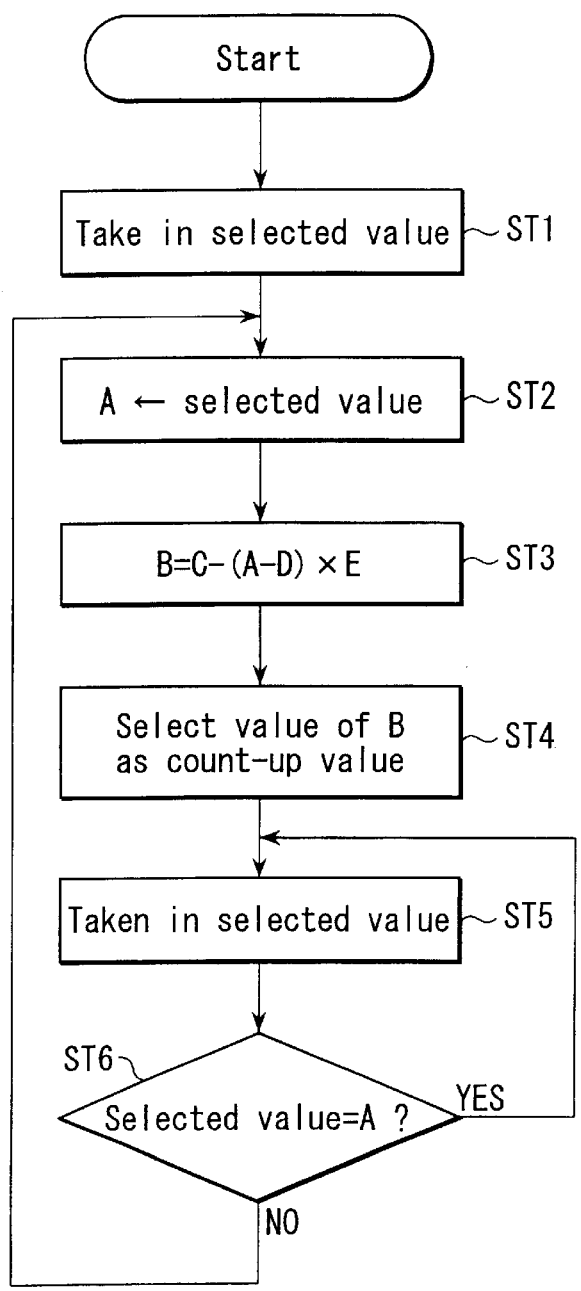
FIG. 2 is part of the data that may be stored in the conversion table of FIG. 1.
FIG. 4 is a flow chart of the processing operation of the count value selecting section 22 of FIG. 3, illustrating the sequence of operation.

More specifically, if C=9726, D=128 and E=19, the conversion table 9 stores values as shown in FIG. 2.

The conversion table 9 outputs a numerical value that corresponds to the selected value output from the selected value output circuit 8 as reference value.

Thus, if the selected value is equal to the selected default value of "128", the conversion table 9 outputs the counter default value of "9726" as reference value. Therefore, the period from the time of detection by the photodetector 4 of the laser beam to the start of the next forced emission of the laser beam is made to be equal to the period obtained by subtracting a certain margin from the scanning period corresponding to the default rotary speed of the polygon motor 3. Then, since the default value is selected for the rotary speed of the polygon motor 3, the forced emission of laser beam is started at a time slightly earlier than the time when the scanning position of the laser beam returns to the position of the photodetector 4, or at a time slightly earlier than the end of a scanning period.

On the other hand, if "130" is selected to raise the rotary speed of the polygon motor 3, the reference value is reduced to "9688". As a result, the period from the detection by the photodetector 4 of the laser beam to the next forced emission of laser beam is reduced by 9688/9726≈0.996, or about 0.4%, from the default state. Then, the cycle period of forced emission of laser beam is also reduced along with the reduction of each scanning period due to a raised rotary speed of the polygon motor 3. Therefore, the forced emission of laser beam is started at a time slightly earlier than the time when the scanning laser beam returns to the position of the photodetector 4.

If "125" is selected in order to reduce the rotary speed of the polygon mirror 3, the reference value is raised to "9783". As a result, the period from the detection by the photo detector 4 of the laser beam to the next formed emission of laser beam is extended by 9783/9726≈1.006, or about 0.6% from the default state. Then, the cycle period of forced emission of laser beam is also increased along with the increase of each scanning period due to a reduced rotary speed of the polygon motor 3. Therefore, the forced emission of laser beam is started at a time slightly earlier than the time when the scanning laser beam returns to the position of the photodetector 4.

In a manner as described above, it is possible to start a forced emission of laser beam at a time slightly earlier than the time when the scanning laser beam returns to the position of the photodetector 4 as the cycle period of forced emission of laser beam is corrected as a function of the change in the rotary speed of the polygon motor 3. Therefore, it is possible for the photodetector 4 to the return of the scanning laser beam to the right detecting position of the photodetector 4 for each and every scanning cycle and hence the photodetector 4 can generate a right HSYNC signal all the time. Additionally, no forced emission of laser beam will be started while the scanning laser beam is still in the effective scanning area A2. Therefore, no wrong printing as show in FIG. 11 will take place and hence no degradation of image quality will occur.

Furthermore, if forced emission of laser beam occurs while the scanning laser beam is outside the effective scanning area A2 and not in the vicinity of the photodetector 4, the emitted laser beam can become astray. However, according to the invention, the emission of laser beam is strictly and reliably limited to such a situation that the scanning laser beam is located outside the effective scanning area A2 and in the vicinity of the photodetector 4. Therefore, the emitted laser beam can be effectively prevented from becoming astray. In other words, of stray laser beams can be effectively prevented from occurring.

If forced emission occurs in the effective scanning area A2, the developing agent can be wasted due to the exposure to the laser beam in that area. However, this embodiment can reliably prevent such waste of developing agent.

(2nd Embodiment)

Figure 3:
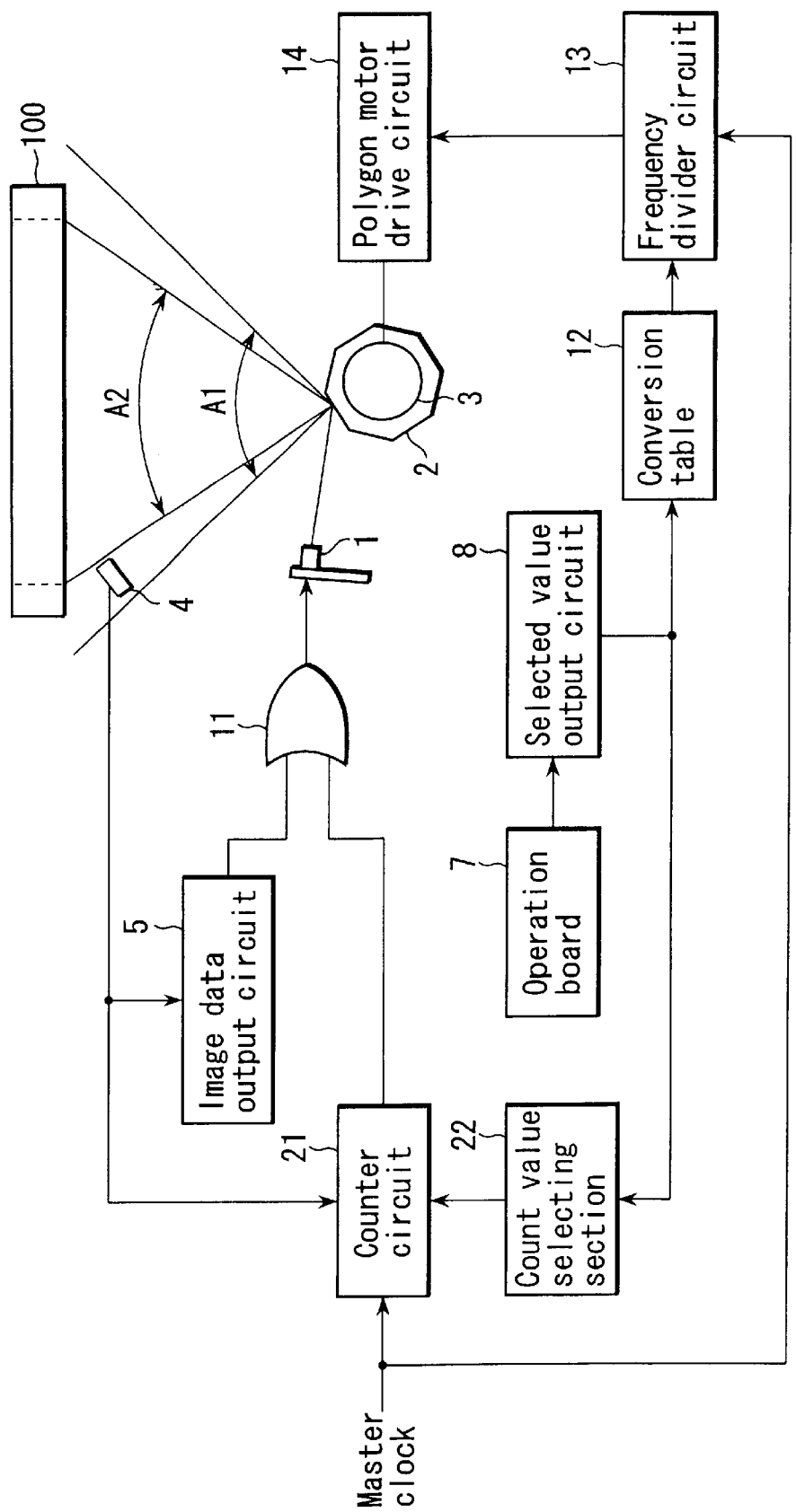
FIG. 3 is a schematic block diagram of the second embodiment of laser scanner according to the invention, illustrating a principal part thereof.

FIG. 3 is a schematic block diagram of the second embodiment of laser scanner according to the invention, illustrating a principal part thereof. The components same as or similar to those of the first embodiment are denoted respectively by the same reference symbols and will not be described any further.

Referring to FIG. 3, the laser scanner of this embodiment comprises a laser diode 1, a polygon mirror 2 operating as deflection optical system, a polygon motor 3, a photodetector 4 operating as laser detection section, an image data output circuit 5 operating as light emission control section, a operation board 7, a selected value output circuit 8, an OR circuit 11, a conversion table 12, a frequency divider circuit 13, a polygon motor drive circuit 14, a counter circuit 21 operating as forced light emission control section and a count value selecting section 22 operating as count-up value selecting section. A horizontal synchronization detecting/control section is realized by the counter circuit 21 and the count value selecting section.

Thus, this embodiment is realized by replacing the counter circuit 6, the conversion table 9 and the comparator circuit 10 with the counter circuit 21 and the count value selecting section 22.

The counter circuit 21 is provided with a master clock. The counter circuit 21 counts up the master clock to a count-up value that is selected in advance. The counter circuit 21 sets the level of its output to level "L" if the count value is short of the selected count-up value, whereas it sets the level of its output to level "H" if the count value gets to the selected count-up value. The output of the counter circuit 21 is applied to the OR circuit 11 as HSYNC start signal. The count value of the counter circuit 21 is reset by an HSYNC signal.

The count value selecting section 22 is typically realized by using a microcomputer. If the selected value output from the selected value output circuit 8 is changed, the count value selecting section 22 counts up to the changed selected value and specifies the obtained count-up value to the counter circuit 21.

Now, the operation of laser scanner having the above described configuration will be discussed below.

The operation of changing the pitch of arrangement of pixels in the main-scanning direction in response to a change made to the selected value of this embodiment is same as that of Embodiment 1 and hence will not be described here any further.

HSYNC signals for making the image data output circuit 5 output image data signals in synchronism with the scanning laser beam are generated by the photodetector 4 and the counter circuit 21 in a manner as described below.

Firstly as the photodetector 4 detects a laser beam, the counter circuit 21 is reset at the timing of bringing the HSYNC signal down to level "L". As a result, the counter circuit 21 counts the master clock from the time when the photodetector 4 detects the laser beam. Since the counter circuit 21 holds its output level to "L" until the count value gets to the count-up value selected in advance, the HSYNC start signal remains at level "L" for a while after the detection by the photodetector 4 of the laser beam. Therefore, only the image data signal output from the image data output circuit 5 appears in the light modulation signal.

When the counter value gets to the selected count-up value, the counter circuit 21 brings its output to level "H" and therefore the HSYNC start signal is also brought up to level "H". As a result, the light modulation signal is constantly held to level "H" so that the photodetector 4 now can detect a laser beam. As a laser beam is detected by the photo detector 4 thereafter and the counter circuit 21 is reset, the count value falls below the selected count-up value to bring the HSYNC start signal down to level "L" and the constant emission of laser beam is suspended.

In this way, the forced emission of laser beam continues from the time comes after a predetermined time period since the detection by the photo detector 4 of the laser beam to the time when the laser beam is detected again by the photodetector 4 so that the photodetector 4 can detect the laser beam at any time. The time period from the time when the laser beam is detected by the photodetector 4 to the time when the forced emission of laser beam starts is defined by the count-up value specified to the counter circuit 21. The count-up value is selected by the count-up selecting section 22 by means of the processing operation as described below.

The count value selecting section 22 carries out a processing operation as shown in FIG. 4 in a predetermined operation period that may typically be the time period between the time when a start command is issued from the control section that controls the overall operation of the image forming device in which the laser scanner is mounted and the time when a stop command is issued from the control section.

For the processing operation, the count value selecting section 22 firstly takes in the selected value output from the selected value output circuit 8 (Step ST1). Then, the count value selecting section 22 substitutes the variable A of the formula below with the selected value it has taken in (Step ST2) and performs the arithmetic operation of the formula below (Step ST3), $$B=C-(A-D)\times E,$$

where C is the value (counter default value) obtained by subtracting a certain margin from the master clock count corresponding to the scanning period when the rotary speed of the polygon motor 3 is equal to the default value, D is the selected default value and E is the variation of the master clock count of the single scanning period as determined on the basis of the ratio of the change in the rotary speed of the polygon motor 3 due to the change by a step of the selected value.

Then, the count value selecting section 22 sets the value of the variable B computed in Step ST3 in the counter circuit 21 as count-up value (Step ST4).

Thereafter, the count value selecting section 22 waits for a change in the updated selected value output from the selected value output circuit 8 that is made by substituting the variable A (Step ST5 and Step ST6). When the updated selected value output from the selected value output circuit 8 is changed as a result of substituting the variable A, in other words, when the updated selected value is changed in response to a value specifying operation of the user, the count value selecting section 22 sets a count-up value that corresponds to the changed selected value in the counter circuit 21 by carrying out the steps starting from Step ST2 once again.

Assume here that C=9726, D=128 and E=19.

If the selected value is the default value of "128" when the count value selecting section 22 is made to start operating, an arithmetic operation of $$B=9726-(128-128)\times 19$$

is performed in Step ST3 and, as a result, the numerical value of "9726" obtained for the variable B is set in the counter circuit 21 as the selected count-up value. In other words, the counter default value is selected as count-up value and hence the time period from the time when the laser beam is detected by the photodetector 4 to the time when the next forced emission of laser beam starts is equal to the time period obtained by subtracting a certain margin from the scanning period corresponding to the default rotary speed of the polygon motor 3. Then, as the default rotary speed is selected for the polygon motor 3, the forced emission of laser beam is started slightly before the end of the scanning period, or the time when the scanning laser beam returns to the position of the photodetector 4.

If, on the other hand, the selected value is changed to "130" to raise the rotary speed of the polygon motor 3, an arithmetic operation of $$B=9726-(130-128)\times 19$$

is performed in Step ST3 and, as a result, the numerical value of "9688" obtained for the variable B is set in the counter circuit 21 as the selected count-up value. As a result, the time period from the detection by the photodetector 4 of the laser beam to the next forced emission of laser beam is reduced by $9688/9726\approx 0.996$, or about 0.4%, from the default state. Then, the cycle period of forced emission of laser beam is also reduced along with the reduction of each scanning period due to a raised rotary speed of the polygon motor 3. Therefore, the forced emission of laser beam is started at a time slightly earlier than the time when the scanning laser beam returns to the position of the photodetector 4.

If "125" is selected in order to reduce the rotary speed of the polygon mirror 3, an arithmetic operation of $$B=9726-(125-128)\times 19$$

is performed in Step ST3 and, as a result, the numerical value of "19783" obtained for the variable B is set in the counter circuit 21 as the selected count-up value. As a result, the period from the detection by the photo detector 4 of the laser beam to the next formed emission of laser beam is extended by $9783/9726\approx 1.006$, or about 0.6% from the default state. Then, the cycle period of forced emission of laser beam is also increased along with the increase of each scanning period due to a reduced rotary speed of the polygon motor 3. Therefore, the forced emission of laser beam is started at a time slightly earlier than the time when the scanning laser beam returns to the position of the photodetector 4.

Figure 11A:
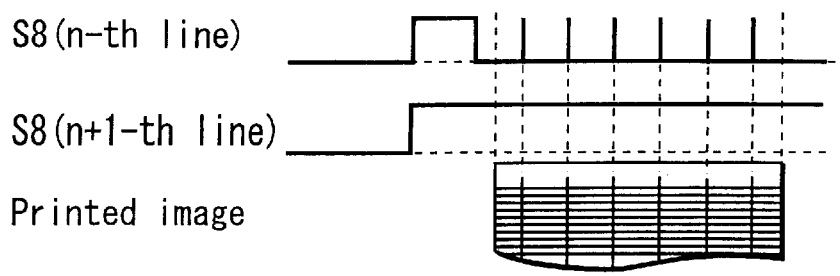
FIG. 11A and FIG. 11B are schematic illustrations of wrong printings that can be produced when the timing at which the scanning laser beam passes the photodetector and the timing of forced emission of a laser beam come to disagree with each other.
Figure 11B:
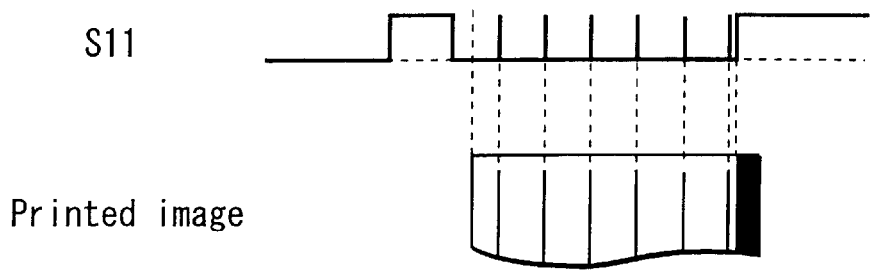
Figure 12:
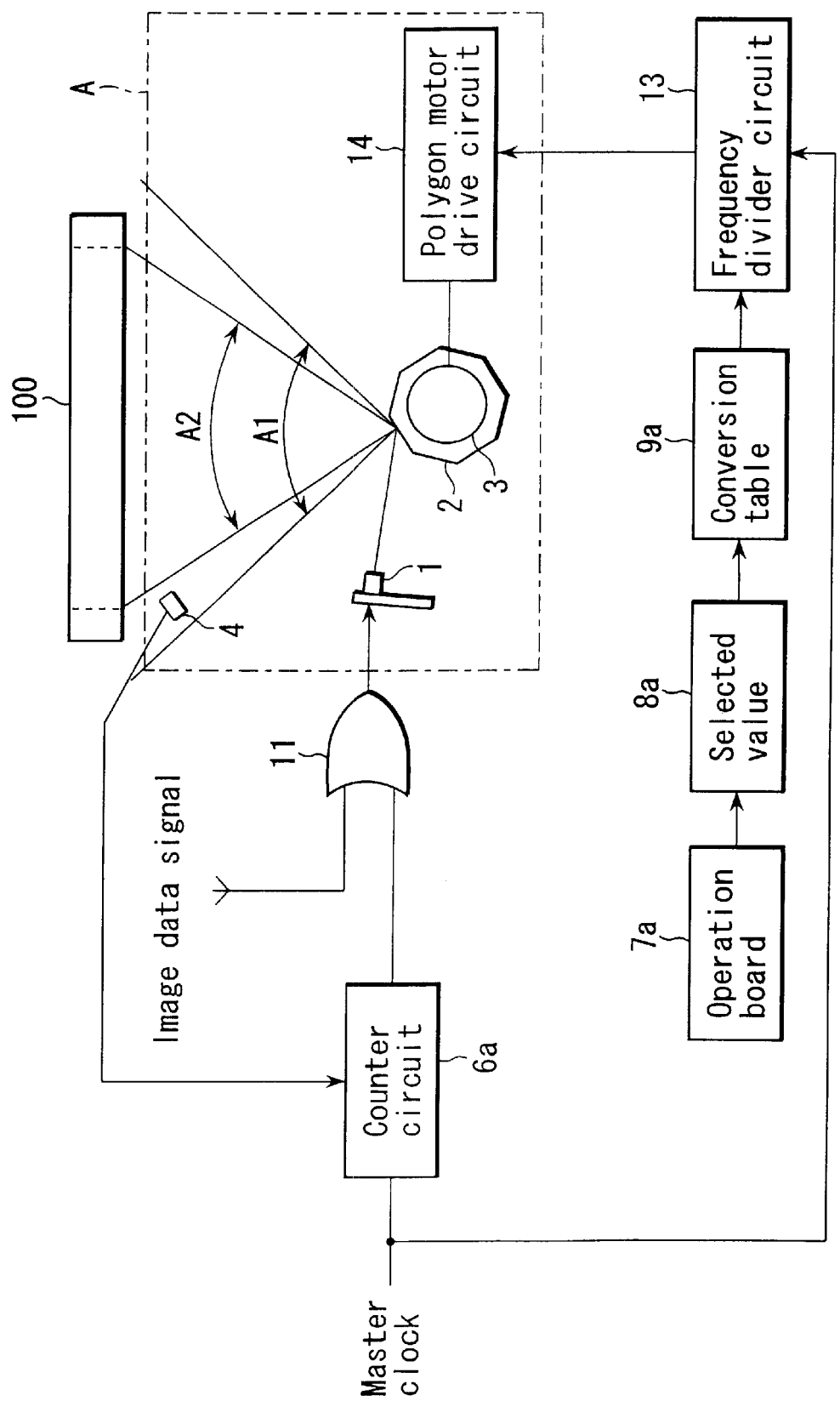
FIG. 12 is a schematic block diagram of a conventional laser scanner.

In a manner as described above, it is possible to start a forced emission of laser beam at a time slightly earlier than the time when the scanning laser beam returns to the position of the photodetector 4 as the cycle period of forced emission of laser beam is corrected as a function of the change in the rotary speed of the polygon motor 3. Therefore, it is possible for the photodetector 4 to detect the return of the scanning laser beam to the right detecting position of the photodetector 4 for each and every scanning cycle and hence the photodetector 4 can generates a right HSYNC signal all the time. Additionally, no forced emission of laser beam will be started while the scanning laser beam is still in the effective scanning area A2. Therefore, no wrong printing as shown in FIG. 11 will take place and hence no degradation of image quality will occur.

Furthermore, if forced emission of laser beam occurs while the scanning laser beam is outside the effective scanning area A2 and not in the vicinity of the photodetector 4, the emitted laser beam can become astray. However, according to the invention, the emission of laser beam is strictly and reliably limited to such a situation that the scanning laser beam is located outside the effective scanning area A2 and in the vicinity of the photodetector 4. Therefore, the emitted laser beam can be effectively prevented from becoming astray. In other words, of stray laser beams can be effectively prevented from occurring.

If forced emission occurs in the effective scanning area A2, the developing agent can be wasted due to the exposure to the laser beam in that area. However, this embodiment can reliably prevent such waste of developing agent.

Figure 5:
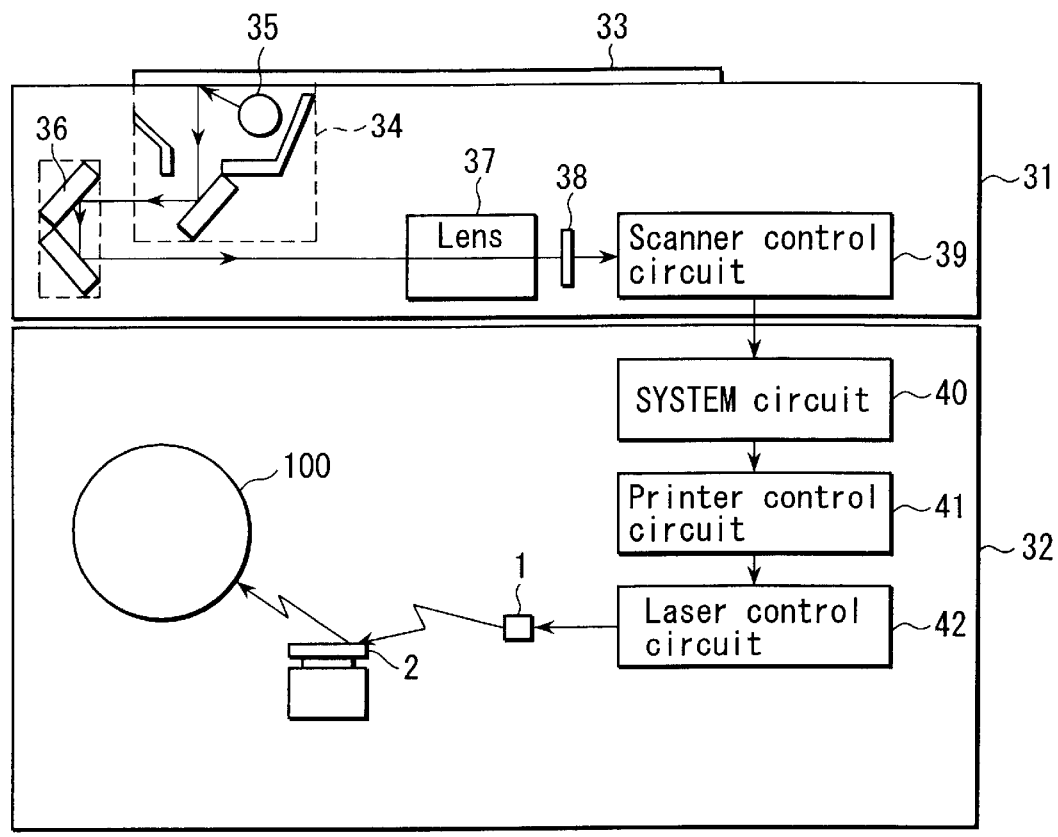
FIG. 5 is a schematic block diagram of a copying machine realized by using the first or second embodiment of laser scanner according to the invention.
Figure 6:
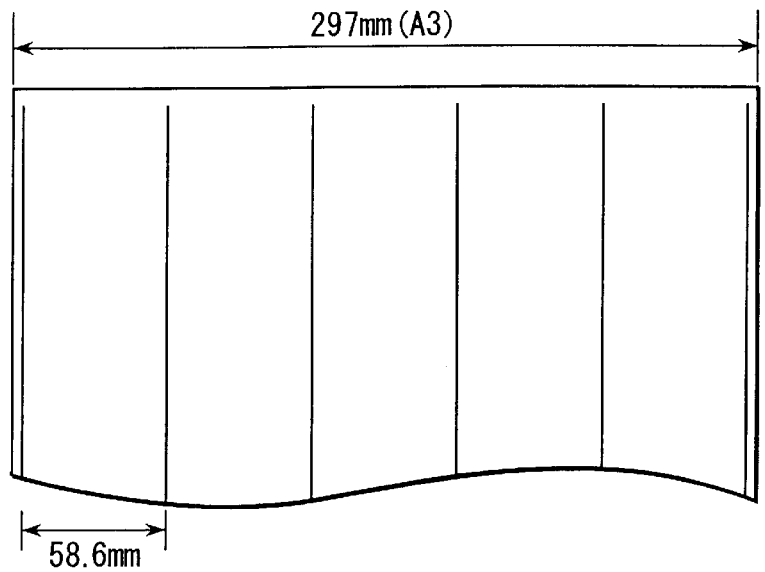
FIG. 6 is a schematic illustration of an exact copy of a document to be used for explaining how a wrong copy is produced due to mismatching of the reading characteristics of the laser scanner and the printing characteristics of the image forming device of a copying machine.
Figure 7:
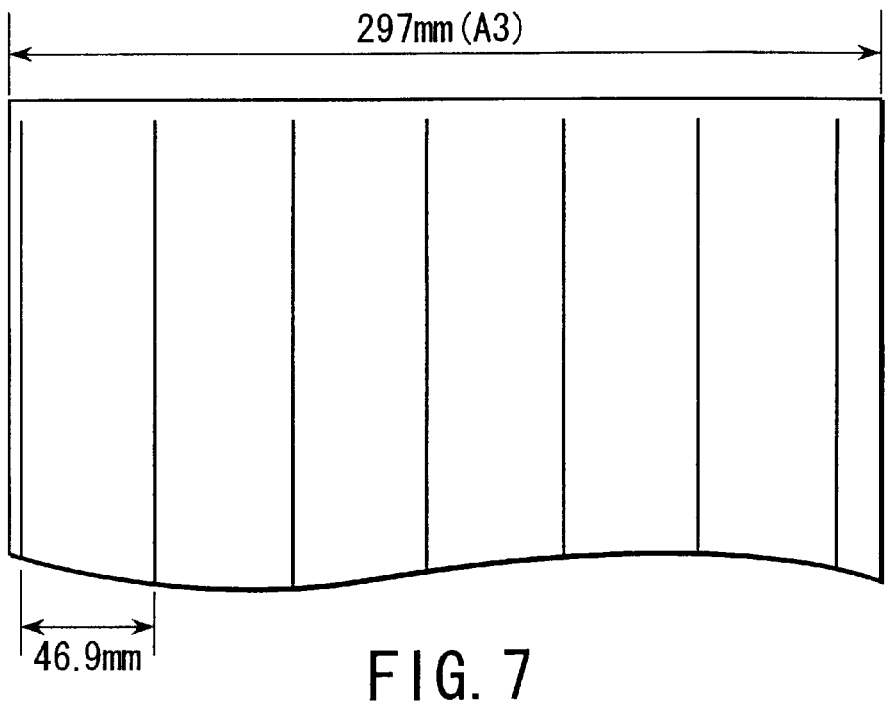
FIG. 7 is a schematic illustration of a wrong copy of an original to be used for explaining how a wrong copy is produced due to mismatching of the reading characteristics of the laser scanner and the printing characteristics of the image forming device of a copying machine.
Figure 8:
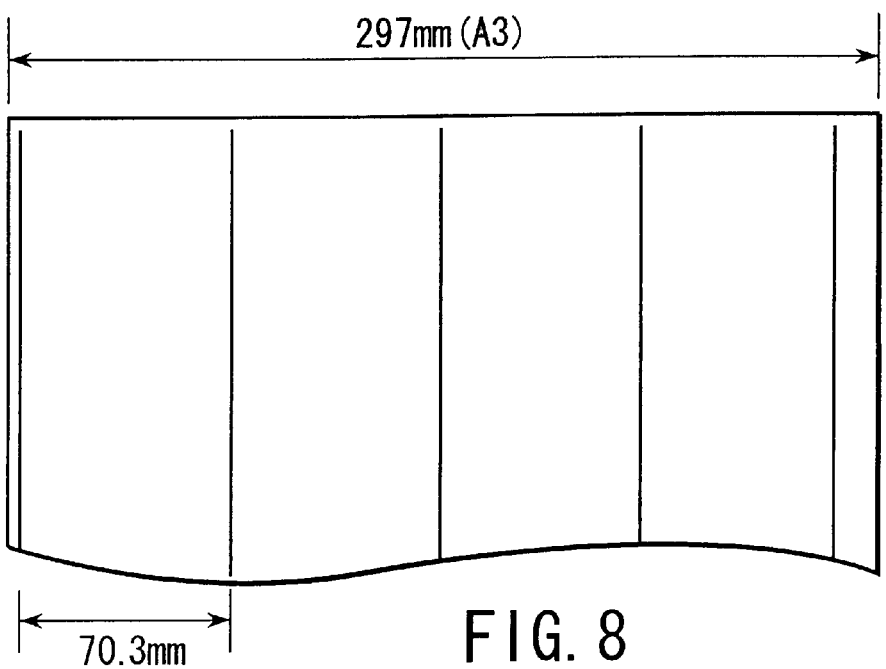
FIG. 8 is a schematic illustration of another wrong copy of an original to be used for explaining how a wrong copy is produced due to mismatching of the reading characteristics of the laser scanner and the printing characteristics of the image forming device of a copying machine.
Figure 9:
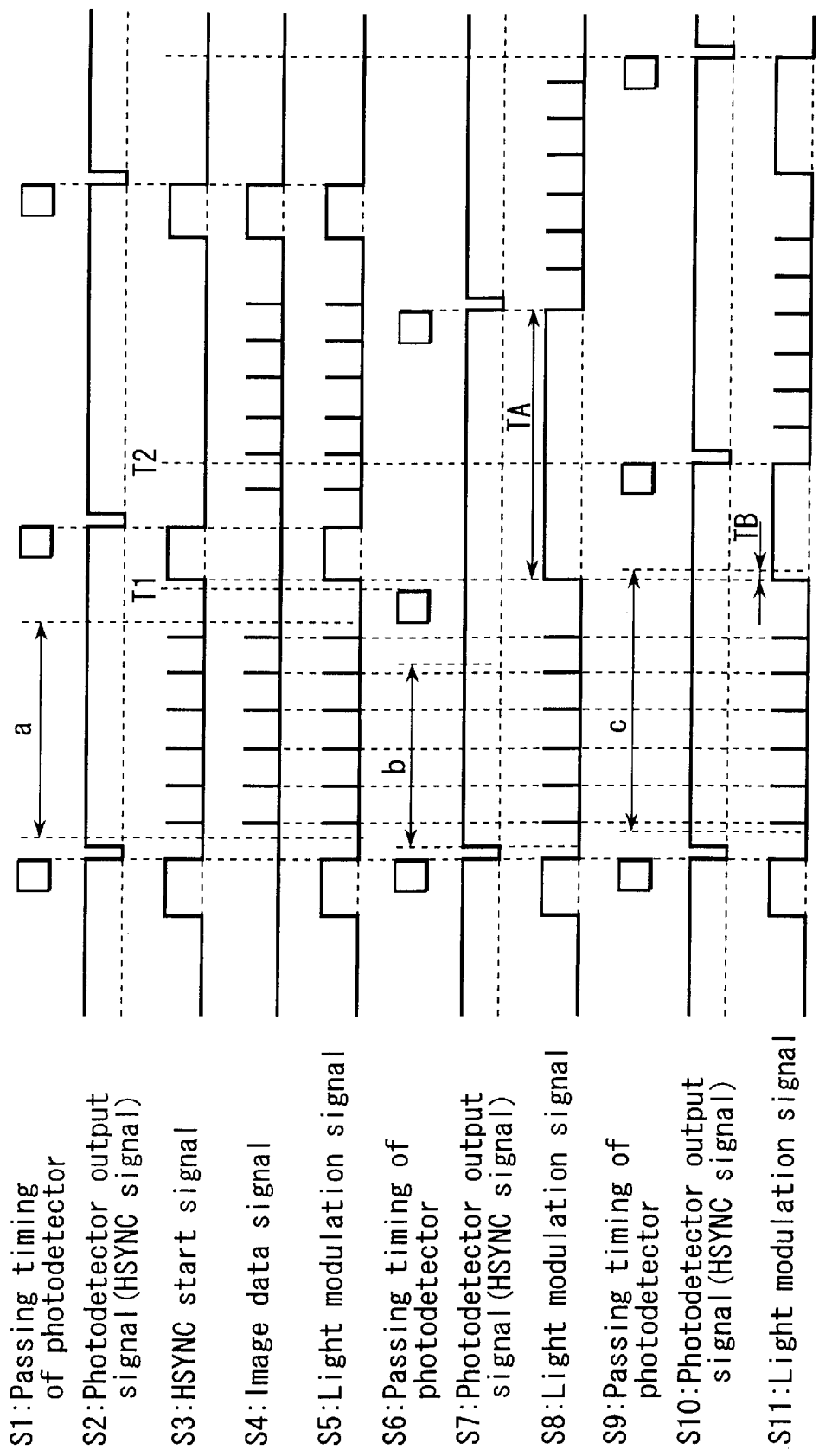
FIG. 9 is a timing chart illustrating how the timing at which the scanning laser beam passes the photodetector and the timing of forced emission of a laser beam come to disagree with each other when the rotary speed of the polygon mirror is changed.
Figure 10:
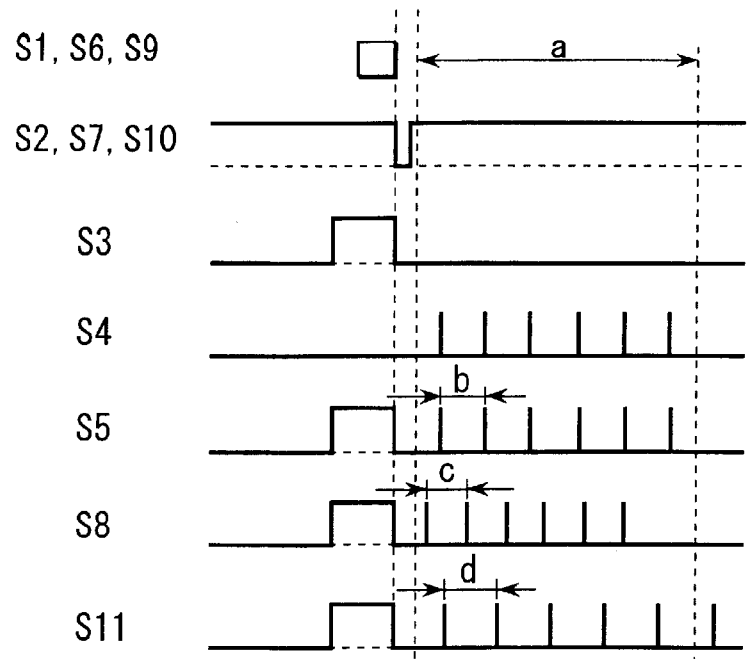
FIG. 10 is a timing chart illustrating the relationship of light modulation signals S5, S8 and S11 in a scanning period.

The first or second embodiment of laser scanner may be mounted in a copying machine as shown in FIG. 5. Referring to FIG. 5, the copying machine comprises a scanner section 31 and a printer section 32. The document 33 placed on the document table of the scanner section 31 is exposed to light emitted from exposure lamp 35 arranged on a carriage 34. The light irradiating the characteristics and the images on the surface of the document 33 is reflected by the mirrors arranged in carriages 34 and 36. The reflected light shows variations in the quantity of light per unit time to reflect the variations in the optical density of the surface of the document. The reflected light is focused on CCD sensor 38 by lens 37. The light reflected from the surface of the document and focused on the CCD sensor 38 is then transformed into a digital image signal as a result of photoelectric conversion. The image signal is subjected to a fundamental correcting operation of scanner control circuit 39 that relates to the original reading optical system such as the CCD sensor 38. Then, the image signal is further subjected to the processing operation of system circuit 40 such as compression or expansion. Printer control circuit 41 performs image correction operations necessary for printing on the image data transmitted from the system circuit 40, rearranges the data good for printing an image and sends the data to the laser control circuit 42. The laser control circuit 42 drives the laser and corrects the temperature of the latter in order to drive the laser diode 1 for photoelectric conversion of the image data signal. The laser beam representing the light signal obtained by the photoelectric conversion of the image data signal performed by the laser diode 1 is then made to scan the surface of the photosensitive drum 100 for exposure.

The present invention is by no means limited to the above described embodiments. For example, while Embodiment 1 uses a conversion table 9 for generating reference values, the generation of reference values may be realized by using software instead of using the conversion table 9 as in the case of Embodiment 2.

Conversely, while software is used for computing the count-up value in the second Embodiment, a conversion table may alternatively be used as in the case of the first Embodiment. Furthermore, while the output of the counter circuit 21 of the second Embodiment is held to level "L" until its count value that is counted up by the master clock gets to a predetermined count-up value and brought up to level "H" when the count value gets to the predetermined count-up value, it may alternatively be so arranged that the count-up value selected by the count value selecting section 22 is counted down by the counter circuit 21. With such an arrangement, the output of the counter circuit 21 is held to level "L" until the count value of the counter circuit 21 that is counted down by the master clock get to "O" and brought up to level "H" when the output gets to "0".

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A laser scanner for causing a laser beam to scan in the main-scanning direction by deflecting the laser beam by means of a deflector section, said laser scanner comprising:
    a speed control section configured to control the rotary speed of said deflector section;
    a laser detection section arranged within the scanning range of said laser beam and configured to obtain a horizontal synchronizing signal by detecting said laser beam; and
    a horizontal synchronization detecting/control section configured to detect said horizontal synchronizing signal by forced emission of laser beam after a predetermined time period since the detection of said laser beam by said laser detector section, said predetermined time period being variable as a function of said rotary speed.

2. The laser scanner according to claim 1, wherein said predetermined time period is so selected that it is made short when the rotary speed of the deflector section is raised and it is made long when the rotary speed of the deflector section is reduced.

3. A laser scanner for causing a laser beam to scan in the main-scanning direction by deflecting the laser beam by means of a deflector section, said laser scanner comprising:
    a speed control section configured to control the rotary speed of said deflector section;
    a laser detector section arranged within the scanning range of said laser beam and configured to obtain a horizontal synchronizing signal by detecting said laser beam;
    a horizontal synchronization detecting/control section configured to start a counting operation of a counter in response to the detection of said laser beam by said laser detector section and cause forced emission of laser beam in response to the completion of counting a reference value by said counter;
    a light emission control section configured to control the operation of turning ON/OFF said laser beam according to image data applied to it to be carried out at a constant rate after the detection of said laser beam by said laser detector section; and
    a reference value changing section configured to change the selected reference value so as to make it correspond to the rotary speed of said deflector section.

4. The laser scanner according to claim 3, further comprising:
    an input section configured to receive the rotary speed of said deflector section as input, wherein the rotary speed of said deflector section input from said input section being output to said speed control section and said reference value changing section.

5. The laser scanner according to claim 3, wherein said horizontal synchronization detecting/control section having:
    a counter configured to count reference clock signals after the detection of the laser beam by said laser detecting section;
    a reference value output section configured to output said reference value; and
    a forced light emission control section configured to compare the count value output from said counter and said reference value output from said reference value output section and causes forced emission of laser beam depending on the outcome of said comparison.

6. The laser scanner according to claim 5, wherein said counter is reset when the laser beam is detected by said laser detecting section.

7. The laser scanner according to claim 5, wherein said reference value output section has a conversion table.

8. The laser scanner according to claim 7, wherein said conversion table contains a variable reference value that is inversely proportional to the rotary speed of said deflector section.

9. The laser scanner according to claim 3, wherein said horizontal synchronization detecting/control section comprising:
    a forced light emission control section configured to continue the operation of counting said clock signals until the count value gets to a predetermined value and cause forced emission of laser beam when said count value get to said predetermined value; and
    a count value selecting section configured to select said reference value and setting it as said count value in said forced light emission control section.

10. The laser scanner according to claim 9, wherein said count value selecting section is comprised by a microcomputer.

11. A laser scanner for causing a laser beam to scan in the main-scanning direction by deflecting the laser beam by means of a deflector section, said laser scanner comprising:
    a speed control means for controlling the rotary speed of said deflector section;
    a laser detection means arranged within the scanning range of said laser beam and for obtaining a horizontal synchronizing signal by detecting said laser beam; and
    a horizontal synchronization detecting/control means for detecting said horizontal synchronizing signal by forced emission of laser beam after a predetermined time period since the detection of said laser beam by said laser detection means, said predetermined time period being variable as a function of said rotary speed.

12. The laser scanner according to claim 11, wherein said predetermined time period is so selected that it is made short when the rotary speed of the deflector section is raised and it is made long when the rotary speed of the deflector section is reduced.

13. A copying machine comprising:
    an image data reading section configured to read image data; and
    a laser scanner for causing a laser beam to scan in the main-scanning direction by deflecting the laser beam by means of a deflector section, wherein said laser scanner comprising:
        a speed control section configured to control the rotary speed of said deflector section;
        a laser detection section arranged within the scanning range of said laser beam and configured to obtain a horizontal synchronizing signal by detecting said laser beam;

a horizontal synchronization detecting/control section configured to start a counting operation of a counter in response to the detection of said laser beam by said laser detection section and cause forced emission of laser beam in response to the completion of counting a reference value by said counter;

a light emission control section configured to control the operation of turning ON/OFF said laser beam according to said image data applied to it to be carried out at a constant rate after the detection of said laser beam by said laser detection section; and a reference value changing section configured to change the selected reference value so as to make it correspond to the rotary speed of said deflector section.

14. The laser scanner according to claim 13, wherein said horizontal synchronization detecting/control section comprising:

a forced light emission control section configured to continue the operation of counting said clock signals until the count value gets to a predetermined value and cause forced emission of laser beam when said count value get to said predetermined value; and a count value selecting section configured to select said reference value and setting it as said count value in said forced light emission control section.

15. The laser scanner according to claim 14, wherein said count value selecting section is comprised by a microcomputer.

16. The copying machine according to claim 13, further comprising an input section adapted to receive the rotary speed of said deflector section as input, wherein the rotary speed of said deflector section input from said input section being output to said speed control section and said reference value changing section.

17. The copying machine according to claim 13, wherein said horizontal synchronization detecting/control section comprising:

a counter configured to count reference clock signals after the detection of the laser beam by said laser detection section;

a reference value output section configured to output said reference value; and a forced light emission control section configured to compare the count value output from said counter and said reference value output from said reference value output section and causes forced emission of laser beam depending on the outcome of said comparison.

18. The copying machine according to claim 13, wherein said counter is reset when the laser beam is detected by said laser detection section.

19. The copying machine according to claim 13, wherein said reference value output section has a conversion table.

20. The copying machine according to claim 19, wherein said conversion table contains a variable reference value that is inversely proportional to the rotary speed of said deflector section.

21. A scanning method of a laser scanner adapted to cause a laser beam to scan in the main-scanning direction by deflecting the laser beam by means of a deflector section, said method comprising:

detecting the laser beam; and causing forced emission of laser beam after a predetermined time period since the detection of said laser beam, said predetermined time period being variable as a function of said rotary speed of said deflector section.

* * * * *